United States Patent [19]
Khan et al.

[11] Patent Number: 6,069,767
[45] Date of Patent: May 30, 2000

[54] BOTH ENDS OPEN FLUID DYNAMIC BEARING WITH MULTIPLE THRUST PLATES

[75] Inventors: Raquib Uddin Khan, Pleasanton; Gunter Karl Heine, Aptos; Hans Leuthold, Santa Cruz; Mohamed Mizanur Rahman, San Jose, all of Calif.

[73] Assignee: Seagate Technology, Inc., Scotts Valley, Calif.

[21] Appl. No.: 09/043,065

[22] PCT Filed: Dec. 19, 1997

[86] PCT No.: PCT/US97/24261

§ 371 Date: Dec. 19, 1997

§ 102(e) Date: Dec. 19, 1997

[87] PCT Pub. No.: WO98/48422

PCT Pub. Date: Oct. 29, 1998

Related U.S. Application Data

[60] Provisional application No. 60/044,171, Apr. 23, 1997.

[51] Int. Cl.$^7$ .................................................. G11B 17/02
[52] U.S. Cl. ......................................................... 360/99.08
[58] Field of Search ............................... 360/98.07, 99.08

[56] References Cited

U.S. PATENT DOCUMENTS

| | | | |
|---|---|---|---|
| 4,795,275 | 1/1989 | Titcomb et al. | 384/107 |
| 5,433,529 | 7/1995 | Hensel | 384/112 |
| 5,457,588 | 10/1995 | Hattori et al. | 360/99.08 |
| 5,559,651 | 9/1996 | Grantz et al. | 360/99.08 |
| 5,580,175 | 12/1996 | Polch et al. | 384/113 |
| 5,590,003 | 12/1996 | Dunfield et al. | 360/98.07 |
| 5,707,154 | 1/1998 | Ichiyama | 384/107 |

*Primary Examiner*—A. J. Heinz

[57] ABSTRACT

The third dynamic bearing includes a fixed shaft and a sleeve rotating around and surrounding the shaft, and at least first and second thrust plates separated by a portion of the shaft. The shaft includes an axial hole to vent appropriate positions inside the bearing. The axial hole extends from one end of the shaft past at least one of the thrust plates. The axial hole is connected by a radial bore to the bearing gap at a location between the thrust plate closest to that one end of the shaft and the facing counterplate.

Alternatively, the axial hole can extend beyond the farthest thrust plate from the one end of the shaft, and can be connected to the bearing gap by a second radial cross-bore. A meniscus forms in the bearing gap on either side of each vent opening, decoupling adjacent bearing sections of the hydrodynamic bearing.

18 Claims, 3 Drawing Sheets

BOTH ENDS OPEN FLUID DYNAMIC BEARING WITH MULTIPLE THRUST PLATES

CROSS-REFERENCE TO RELATED APPLICATION

This application claims priority to U.S. Provisional Patent Application, Ser. No. 60/044,171 filed Apr. 23, 1997, assigned to the assignee of this application.

Reference should also be made to U.S. patent application, Ser. No. 08/944,100 filed Dec. 19, 1997 (Attorney Docket No. A-64698/JAS); U.S. patent application Ser. No. 08/981,548, filed Dec. 19, 1997 (Attorney Docket No. A-65139/JAS); and U.S. patent application Ser. No. 08/981,338, filed Dec. 19, 1997 (Attorney Docket No. A-64699/JAS); all of which are assigned to the assignee of this invention and are incorporated herein by reference.

FIELD OF THE INVENTION

The present invention relates to magnetic disc drive storage systems, and more specifically, the present invention relates to a hydrodynamic fluid bearing for use in a magnetic disc drive storage system.

BACKGROUND OF THE INVENTION

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density has tended to increase and the size of the storage system has tended to decrease. This trend has lead to greater precision and lower tolerance in the manufacturing and operating of magnetic storage discs. For example, to achieve increased storage densities the transducing head must be placed increasingly close to the surface of the storage disc. This proximity requires that the disc rotate substantially in a single plane. A slight wobble or run-out in disc rotation can cause the surface of the disc to contact the transducing head. This is known as a "crash" and can damage the transducing head and surface of the storage disc resulting in loss of data.

From the foregoing discussion, it can be seen that the bearing assembly which supports the storage disc is of critical importance. One typical bearing assembly comprises ball bearings supported between a pair races which allow a hub of a storage disc to rotate relative to a fixed member. However, ball bearing assemblies have many mechanical problems such as wear, run-out and manufacturing difficulties. Moreover, resistance to operating shock and vibration is poor, because of low damping. Thus, there has been a search for alternative bearing assemblies for use with high density magnetic storage discs.

One alternative bearing design which has been investigated is a hydrodynamic bearing. In a hydrodynamic bearing, a lubricating fluid such as air or liquid provides a bearing surface between a fixed member of the housing and a rotating member of the disc hub. In addition to air, typical lubricants include oil or ferromagnetic fluids. Hydrodynamic bearings spread the bearing interface over a large surface area in comparison with a ball bearing assembly which comprises a series of point interfaces. This is desirable because the increased bearing surface reduces wobble or run-out between the rotating and fixed members. Moreover, the use of fluid in the interface area imparts damping effects to the bearing which helps to reduce non-repeatable runout.

However, hydrodynamic bearings themselves suffer from disadvantages, including a low stiffness-to-power ratio. These problems lead to a high sensitivity of the bearing to external loads or shock.

A desirable solution to this problem would be to have the spindle motor attached to both the base and the top cover of the disc drive housing. This would increase overall drive performance. A motor attached at both ends is significantly stiffer than one held by only one end.

Known hydrodynamic motor designs provide no method for top cover attachment. The reason for this is that in order to have top cover attachment, the motor bearing would need to be open on both ends. Opening a hydrodynamic bearing type motor bearing at both ends greatly increases the risk of oil or fluid leakage out of the hydrodynamic bearing. This leakage is caused among other things by small differences in flow rate created by differing pumping pressures in the bearing. If all of the flows within the bearing are not carefully balanced, a net pressure rise toward one or both ends will force the fluid out through the capillary seal. Balancing the flow rates in conventional, known thrust plate bearing designs is difficult because the flow rates created by the pumping grooves are a function of the gaps defined in the hydrodynamic bearing; the flow rate may change with RPM or the load on the motor. Thus, a need exists for a new approach to the design of a hydrodynamic bearing based motor to optimize dynamic motor performance, stiffness (both radial and axial) and damping.

SUMMARY OF THE INVENTION

Thus, it is an object of the present invention to create an improved hydrodynamic bearing which is relatively insensitive to changes in load and rotational speed.

Another objective of the invention is to provide a hydrodynamic bearing having increased stiffness.

Another objective of the invention is to provide a hydrodynamic bearing useful in a spindle motor for a disc drive or the like which is stiffer than known standard spindle motors which are supported only at one end so that the stability of the system and specifically of the transducer relative to the rotating disc is optimized.

A further objective of the invention is to design a hydrodynamic bearing useful in a spindle motor or the like in which the motor could be attached to both the top cover and the base of the housing for the spindle motor.

Yet another objective of the present invention is to provide a hydrodynamic bearing motor in which the bearing is open at both the upper and lower ends.

These and other objectives of the present invention are achieved by providing a hydrodynamic bearing useful as a bearing cartridge or as the cartridge may be incorporated into a spindle motor or the like, where the bearing includes a shaft and at least two independent bearings each comprising a thrust plate supported on the shaft and a counter plate incorporated in a sleeve which is capable of relative rotation around the shaft. Because of the deviation from actual geometry in different parts in the bearing due to manufacturing limitations, the multithrust plate or single plate type bearing with top cover attachment—open at both ends may force the fluid out of the bearing. This effect is caused due to the pressure imbalance inside the bearing generated by the hydrodynamic action. In such a situation, the whole bearing with multiple thrust plates must be separated into sections, these can be separated or decoupled from each other to minimize the effect of pressure imbalance thus eliminating or reducing the chances of fluid leakage.

In this kind of arrangement, the individual bearings have to be vented in different ways in different locations to establish the separation. Each thrust plate includes a radial vent opening extending radially through the plate, and an axial vent hole at the plates inner radius connecting with the radial vent. In the case of a multithrust plate design, a hole through the shaft is connected to vent both the shaft and the thrust plates. A meniscus is formed on either side of each junction of vent to gap.

More specifically, in an exemplary embodiment the bearing includes a fixed shaft and a sleeve rotating around and surrounding the shaft, and at least first and second thrust plates separated by a portion of the shaft. The shaft includes an axial hole to vent appropriate positions inside the bearing. The axial hole extends from one end of the shaft past at least one of the thrust plates. The axial hole is connected by a radial bore to the bearing gap at a location between the thrust plate closest to that one end of the shaft and the facing counterplate.

In an alternative embodiment, the axial hole can extend beyond the farthest thrust plate from the one end of the shaft, and can be connected to the bearing gap by a second radial cross-bore. This approach is useful where the gap between shaft and sleeve beyond the furthest thrust plate from one end of the shaft is to be used as a journal bearing region. A meniscus forms in the bearing gap on either side of each vent opening, decoupling adjacent bearing sections of the hydrodynamic bearing.

In the situation where the bearing is used in a disc drive, typically in a spindle motor or as another bearing, the open end of the axial hole is at the bottom or base, and the closed end of the axial bore at the top. Grooves can be formed on shaft or sleeve in many of the gap regions to increase stiffness. Grooves could also appear on one or more of the counterplates, or on one or more thrust plate surfaces.

The use of multiple thrust plates maintains and even increases the stiffness of the overall design without any attendant increase in power consumption. Further, the manufacturing and assembly process does not become more difficult because the gap may be maintained at a reasonable width.

Other features and advantages of the present invention will become apparent to a person of skill in the art who studies the present invention disclosure, given with respect to the following figures.

DETAILED DESCRIPTION OF A PREFERRED EMBODIMENT

Figure 1:
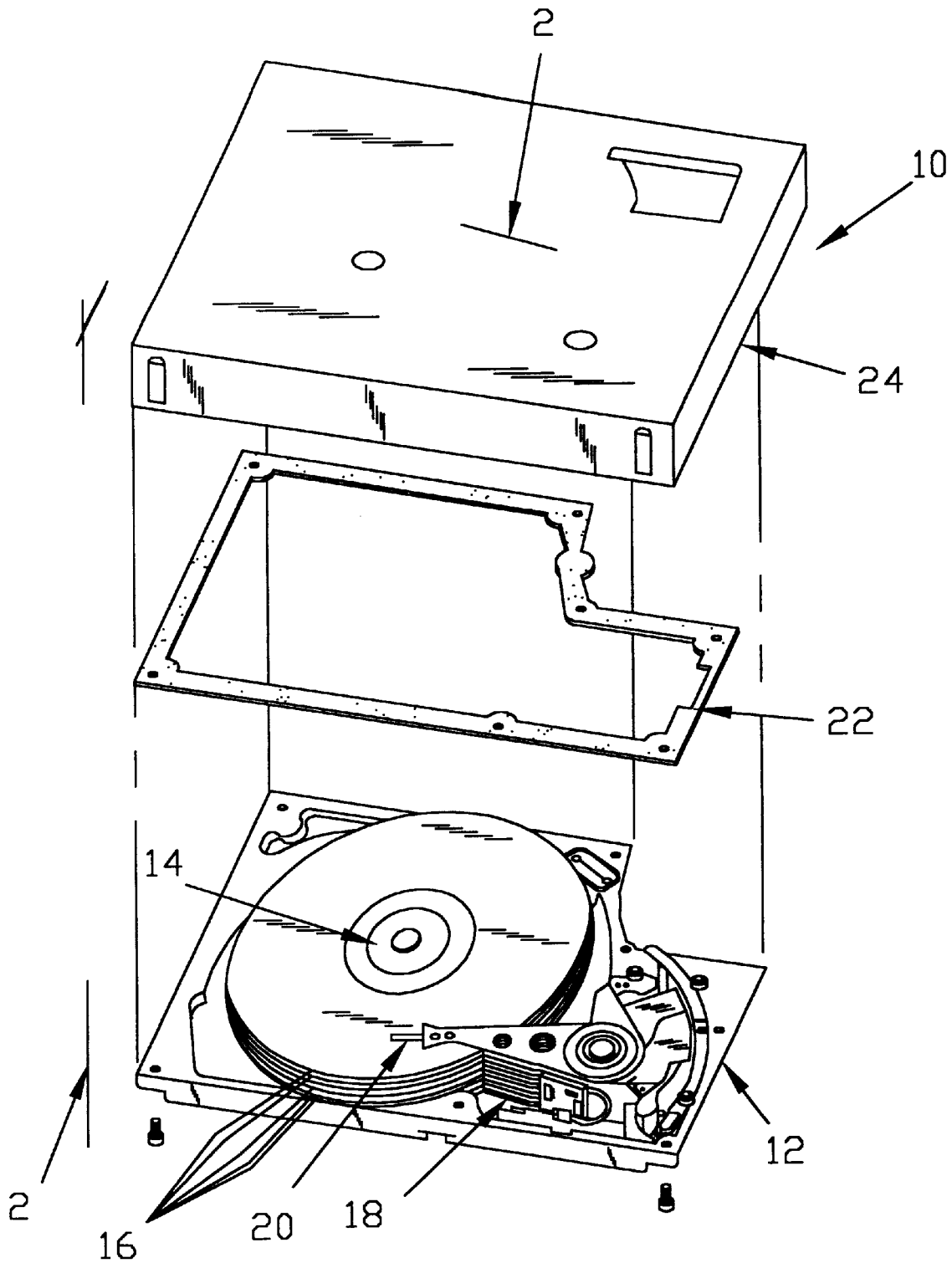
FIG. 1 is a perspective view of a magnetic disc storage system which may incorporate the hydrodynamic bearing cartridge and spindle motor in accordance with the present invention.

FIG. 1 is an exploded perspective view of a magnetic disc drive storage system in which the present hydrodynamic bearing cartridge could be used. In the example to be discussed below, the use of the hydrodynamic bearing and associated cartridge will be shown in conjunction with a spindle motor. Clearly, this bearing cartridge is not limited to use with this particular design of a disc drive, which is shown only for purposes of the example. Given the many advantages which this invention achieves, it could also potentially be used to support the actuator for rotation. The bearing cartridge also has numerous other uses outside of the field of disc drives.

Further, the fluid bearing disclosed herein has a fixed shaft and rotating, surrounding sleeve. The design is also useful where the sleeve is fixed and the shaft rotates. Since the bearing is open at both ends, the shaft could extend beyond the sleeve, and be axially coupled to an external device or system.

In this particular example, the storage system 10 includes a housing base 12 having spindle motor 14 which carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a large number of radially differentiated tracks on the surface of the discs 16. This allows the transducers 20 to read and write magnetically encoded information on the surfaces of discs 16 at selected locations. The discs rotate at very high speeds, several thousand RPM, in order to maintain the transducer flying over the surface of the disc. In present day technology, the spacing distance between the transducer and the rotating disc surface is measured in microinches; thus it is absolutely essential that the disc does not tilt or wobble.

Figure 2:
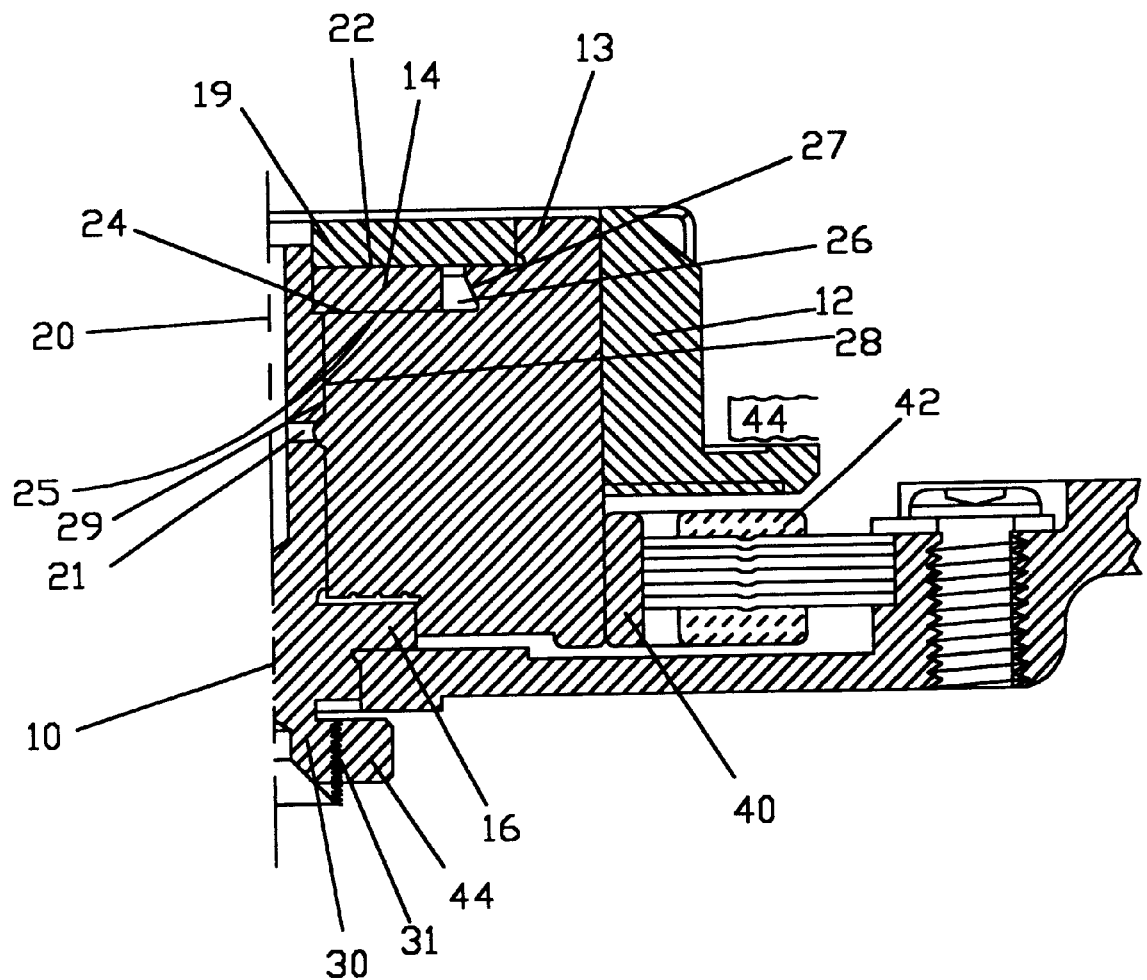
FIG. 2 is a vertical sectional view of a prior art hydrodynamic bearing cartridge incorporated in a spindle motor assembly.

FIG. 2 is a vertical sectional view of a single thrust plate hydrodynamic bearing motor design of a type which is already established in this technology. The basic structure of the motor shown in this figure includes a stationary shaft 10 and a hub 12 supported from a sleeve 13 for rotation around the shaft. The shaft 10 includes a thrust plate 14 at one end, and terminates in a shoulder 16 at the opposite end. The sleeve 13 supports a counterplate 19 at one end, for rotation over the thrust plate 14. The counterplate 19 and thrust plate 14 are separated by a sufficient gap 22 to allow circulation of lubricating fluid to lubricate the hydrodynamic bearing out of the reservoir 20, through the gap 22, through the reservoir 26 defined between the end of the thrust plate 14 and an interior surface 27 of the sleeve 13, and between the lower surface 24 of the thrust plate 14 and an upper surface 25 of the sleeve 13, and between an inner surface 28 of the sleeve and the exterior surface 29 of the fixed shaft. The fluid path is completed to reservoir 20 primarily through a central bore 21. In order to promote the flow of fluid over the bearing surfaces which are defined between the thrust plate 14 and the counterplate 19; between the thrust plate 14 and the sleeve 13, and between the shaft 10 and the sleeve 13, typically one of the two opposing surfaces of each such assembly carries sections of grooves as is well known in this technology.

Flow between the bearing surfaces creates hydrodynamic pressure, resulting in stiffness. The circulation of fluid is maintained through central hole 20 of the shaft to the other bearing surfaces by the appropriate designing of geometry and grooving patterns of the bearing surfaces. The remainder of the structure of significance which is used to complete the motor design include shaft extension 30 which ends in threaded region 31 which is threaded into a portion of the base 44. A stator 42 cooperates with magnets 40 which are supported from the sleeve 13, with energization of the stator windings 42 causing rotation of the sleeve 18 and the hub 12 about the stationary shaft.

As used in a disc drive motor, this system supports one or more discs 44 for rotation. Because the transducers and disc drives fly at extremely low heights over the surface of the disc, it is essential that there not be wobble or vibration of the hub and disc as it rotates. Moreover, it is also important that should such wobble occur, that there is no touch down between the surfaces of the thrust plate 14 and the opposing surface of the counterplate 19 and sleeve 13. However, as explained above, in a cantilever type bearing such as shown in FIG. 2, where the load carrying surface which is thrust plate 14 is located far from the center point about which any pivoting would occur in the event of vibration or wobble, there is a much greater chance of a touch down or contact between the facing surfaces, which would result in both wear of the surfaces over the long term, and a slow down of the rotational speed of the disc in the short term.

It is for this reason that the design of the following figures has been adopted. By adopting this design, load carrying surfaces, whether thrust or conical bearing type, are located closer to the middle of the overall hydrodynamic bearing system. The pivot point about which any rocking of the bearing may occur also lies close to the middle of the bearing. Because of this, by moving the load carrying surfaces as close as possible to the center of the disc, any wobbling or vibration of the disc would have less chance to cause touchdown at the ends of the bearing. By adding thrust plates, the stiffness is increased without reducing the gap width, making the system easy to manufacture.

Figure 3:
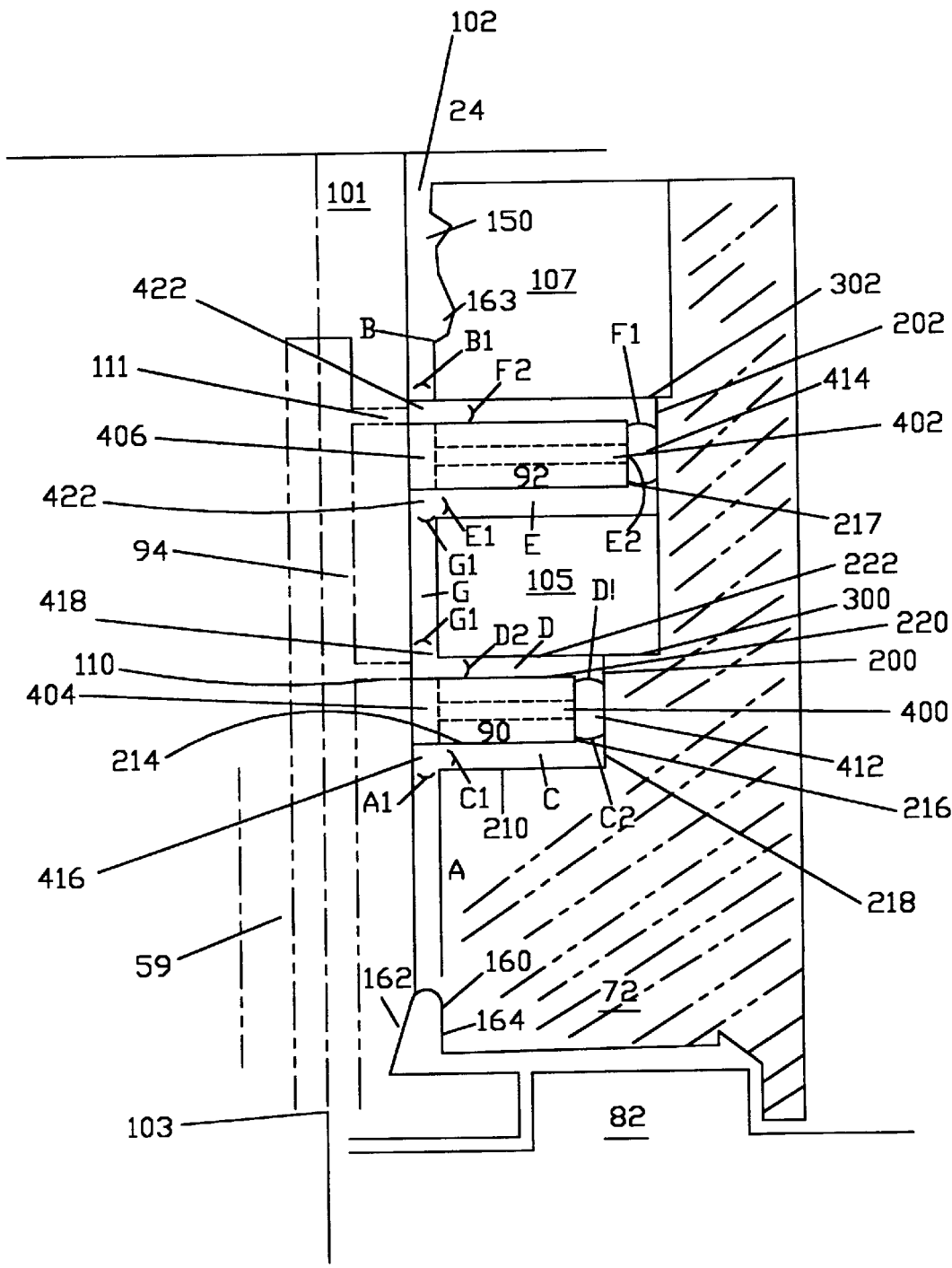
FIG. 3 is a vertical sectional view of a hydrodynamic bearing cartridge in accordance with the present invention.

Referring therefore to FIG. 3, it can be seen that this is a modification which could easily be incorporated into the design of FIG. 2 to form a cartridge which would have many uses, but would be especially useful for mounting a hub such as the hub 71 and to be incorporated into a disc drive. The upper end 101 of shaft 59 could be fastened to the top cover 24 of the disc drive; and the bottom extension of the shaft 59 could be extended to mate with the base portion 82 as indicated and represented in FIG. 2.

The design of the present invention includes at least two thrust plates 90, 92 each mounted on the shaft 59 and spaced apart by a region of the shaft 94. Further, each of the thrust plates is spaced by an end section 101, 103 of the shaft. When used in a disc drive, the top end section 101 is preferably fastened to cover 24; the bottom shaft end section 103 is fastened to or mounted in base 82.

The fluid bearing of this invention is defined between an inner surface of sleeve 72 and counterplates 105, 107 it supports, and the combined outer sleeve of shaft 59 and thrust plates 90, 92. Fluid is maintained in the gap 102 between the fixed portion of the fluid dynamic bearing and the rotating portion. Also, as will be explained in detail below, the fluid in the bearing gap is separated into sections, with the ends of each bearing section defined by a meniscus formed in the fluid.

In operation of the example of FIG. 3, the sleeve 72 rotates relative to shaft 59, circulating the fluid in the fluid bearing, thus creating hydrodynamic pressure. The hydrodynamic fluid creates pressure to separate the rotating portion of the fluid dynamic bearing from the fixed portion, and provides a bearing surface there between. This fluid flow pumping action and pressure generation occurs wherever one of the two facing surfaces in the relatively located sections is properly grooved. Typically, to enhance and maintain the fluid pressure, either the sleeve surfaces directly facing the shaft or the surfaces of the shaft, at the uppermost 101 and lowermost 103 sections of the gap, will be grooved using known spiral or herringbone or similar grooving patterns as are already well known in the art to provide the necessary pumping effect. Alternatively, or in addition, at least one surface of at least one thrust plate or the facing surface of the counterplate will be grooved. Typically, the axial surfaces defining the gap regions 200, 202 at the ends of the thrust plates 90, 92 are not grooved.

Referring again to the FIG. 3, each thrust plate 90, 92 rotates in a recess 200, 202 respectively defined at its end by an axial wall of the sleeve 72 and on either side by radial walls of the sleeve 72 or counterplates 105, 107. Thus, considering thrust plate 90, rotating in recess 200, the bearing gap is defined by a radial wall 210 of sleeve 72, and a radial wall 214 of the thrust plate 90, then by an end wall 216 of the thrust plate 90, and an axial wall 218 of the sleeve 72; and finally the gap extends between a radial wall 220 of the thrust plate and a radial wall 222 of counterplate 105. The gaps around thrust plate 92, and any additional thrust plates which may be mounted on the shaft 59, are similarly defined, so that a continuous gap extending the length of the overlapping shaft and sleeve is defined.

The gaps provide for pumping action of the fluid between the fixed shaft and the rotating sleeve with the gaps providing for free rotation of the sleeve, while the presence of the fluid in each of the bearing sections provides the necessary stiffness and damping, as well as lubrication for rotation of the bearing.

Because of the deviation from actual geometry in different parts in the bearing due to manufacturing limitation, the multithrust plate bearing with top cover attachment which is open at both ends may force the fluid out of the bearing. This effect is caused due to the pressure imbalance inside the bearing generated by the hydrodynamic action. In such a situation, each bearing section defined by the multiple thrust plates must be separated or decoupled from adjacent sections to minimize the effect of pressure imbalance, thus eliminating or reducing the chances of fluid leakage. This is achieved in the present invention by providing means for forming a meniscus across the gap at either end of each fluid bearing section.

In this kind of arrangement, the individual bearings are vented in different ways in different locations. The bearing sections above and below or on either side of each thrust plate are vented by providing cooperating axial and vertical holes in each thrust plate. Where multiple thrust plates are used, they are decoupled by providing an axial hole through the shaft, with radial vent hole or holes establishing the necessary boundary between adjacent bearing sections. Briefly, a meniscus forms on either side of each vent; the meniscus limits fluid circulation through the gap as the shaft 59 and sleeve 72 rotates relative to one another. Thus the possibility of fluid leaving the gap 102 at either end is diminished. According to the present concept, there is no circulation through axial or vertical holes and there is no fluid inside the shaft hole 94. The shaft has through hole 94 only to vent the appropriate positions inside the bearing 102. A radial cross hole 110 runs to gap 102 between the thrust plates 90, 92 causing the formation of a meniscus on either side to isolate the bearing sections formed around each thrust plate. A radial cross hole 111 runs to the gap 102 between top thrust plate 92 and counterplate 107 if the top end (Section B) of the shaft 101 above top thrust plate 92 is used as a bearing surface.

Separate bearing sections are also found on either side of each thrust plate. A meniscus is formed at each end of a bearing section by providing a radial or axial vent hole or bore.

Thus, referring to FIG. 3, radial bore 400 is provided in thrust plate 90, running from axial connector slot 404 to the distal end 216 of the thrust plate 90. The axial connector slot 404 provides a connection between the radially inner end of slot 400 and the continuous bearing gap 102.

The presence of bore 400 aids the formation of a meniscus in the hydrodynamic bearing gap on either side of the junction 412 between bore 400 and the hydrodynamic bearing gap. A meniscus also forms on either side of each junction 416, 418, between axial slots 404 and the hydrodynamic bearing gap 102. This provides the desired isolation between adjacent bearing sections C, D which support rotation of thrust plate 90. Similarly, radial bore 402 and axial bore 406 aid the formation of menisci at each end of bearing sections E, F which support thrust plate 92. The radial vents 110, 111 aid the formation of the menisci at the ends of journal bearing sections A, G and B. Isolation of these journal bearing sections is very important in preventing leakage of lubricating fluid into the atmosphere.

In a preferred embodiment, a notched-type oil trap 150 is also provided at this upper end of the bearing gap 102. This entails cutting a notch into the upper end of the sleeve. Relatively tapered walls face each other across the gap, creating the desired oil trap, which is important if, for any reason, there is any physical migration from capillary seal area. The lower end of the gap 102 shows an alternative form of capillary seal 160 in which the shaft wall section 162 is tapered while the sleeve wall section 164 extends straight. Since the shaft is to be fixed, this tapering of the shaft wall is possible, establishing the capillary seal. Alternatively, of course, the wall 164 of the sleeve 59 could be tapered. The same sort of capillary seal could be provided at the top of the shaft. The design specifics of seals 150, 160 are not critical, so long as an effective seal against leakage is provided at each end of the shaft.

As can be seen from the figure, assembly is achieved by providing the sleeve 72 with stepped features 300, 302, which are axially separated and allow the counterplates 105, 107 to be press fitted into place relative to the thrust plates 90, 92 with which they must cooperate. The thrust plates are mounted onto the shaft by any suitable method. To assemble the fluid dynamic bearing, the shaft 59 with the thrust plates 90, 92 is inserted into the sleeve, the counterplates are guided into place by the stepped features 300, 302.

The filling process can be done at once by plugging the shaft holes and other open end and then by vacuum fill (conventional process). Then take the plugging (seal) out and sling the excess oil out from the bearing.

The other way of filling can be carried out during assembly with a proper amount of hydrofluid dispensing in individual journal and thrust plate regions; in this case cleaning by spinning is not necessary. Another advantage of this process is the application of different hydrofluid (liquid or gas) in different regions of the bearing.

The above described invention has a multitude of advantages including that both ends of the shaft can be fixed; thus when used in a disc drive, top cover attachment is now achievable because of the multi thrust plate arrangement which comes about because of the spacing of each of the thrust plates separated from the ends of the shaft. This multiple thrust plate arrangement enhances the axial stiffness to a considerable degree. Further, the sleeve can be defined as a single section.

Also, there is considerable flexibility on power consumption and stiffness by the ease of adjusting the gap between the multiple thrust plates by adjusting the points of attachment of the thrust plates, and modifying the construction of the sleeve by moving the counterplates.

As disclosed above, this bearing can of course be used as a liquid bearing. However, it is also possible to use as a gas bearing which generates stiffness by multiple step pumping, i.e., by separately pumping sections of the gap around each of the thrust plates and the journal/sleeve areas A, B, G. Thus as used in this application the term "fluid" shall be construed to mean either gas or liquid.

Other features and advantages of the present invention may become apparent to a person of skill in the art who studies the present invention disclosure. For example, it is possible to modify the location and design of the grooving patterns, to enhance or optimize the fluid circulation through the gaps.

By adopting these design principles, a stable system with multiple thrust plates can be achieved. Upper and lower journal bearings A, B have a capillary seal 163, 160 at one end and a meniscus A1, B1 at the other end, so that pressure against either seal is limited. Bearing sections C, D, E and F are provided primarily above and below each thrust plate, each section ending in a meniscus C1, C2 . . . F1, F2.

Since more than one thrust plate is used, it is essential to separate adjacent thrust plates by a section such as G having at least one meniscus G1 established by a vent 110 running to a central shaft hole 94.

Finally, the upper section B may not need to be fluid filled to complete the bearing; but if it is, the provision of vent 111 to establish meniscus B1 is important. Of course, as an alternative, the vents 110 could meet the bearing gap 102 between meniscus A1 and C1 below thrust plate 90; and vent 111 could join the bearing gap between meniscus E1 and G2 below thrust plate 92. Other features and advantages of the present invention may be apparent to a person of skill in the art, and modifications may be made to the example described above. Therefore, the scope of the invention is to be limited only by the following claims.

What is claimed is:

1. A hydrodynamic fluid bearing cartridge comprising a fixed central shaft carrying at least first and second thrust plates separated by a circular shaft portion, said first and second thrust plates being separated from distal ends of said shaft by outer end sections of said shaft, each of said thrust plates comprising first and second radial surfaces connected by an axial surface, and a sleeve which rotates relative to the fixed shaft around a central axis of rotation defined by a central axis of said shaft, said sleeve comprising a counterplate opposing each exposed face of said thrust plate and thereby defining recesses for each of said first and second thrust plates, said recesses each including radial surfaces joined by an axial surface and facing each said radial and axial surface of said thrust plate to define a continuous gap around each said thrust plate, said gap further extending between an internal axial face of said sleeve extending parallel to an axial face of said fixed shaft between said first and second thrust plates, and beyond said first and second thrust plates along end sections of said sleeve to axial ends of said sleeve adjacent said shaft so that said continuous gap is open at each end of said sleeve, and lubricating fluid in said gap between said shaft and said sleeve and said first and second thrust plates and said counterplate so that said sleeve is free to rotate relative to said fixed shaft while maintaining the stiffness of said sleeve relative to said shaft.

2. A hydrodynamic bearing cartridge as claimed in claim 1 wherein said fixed shaft includes central hole connected by one or more radial bores to connect to the bearing gap to maintain an ambient condition or to vent said bearing gap.

3. A hydrodynamic bearing cartridge as claimed in claim 2 wherein said end sections of said sleeve rotating about said shaft separate said first and second thrust plates from said ends of said shaft, and comprising a capillary seal defined between a wall of said shaft and an end section of said sleeve so that said fluid is maintained in said gap between said shaft and said sleeve.

4. A hydrodynamic bearing as claimed in claim 3 wherein one of said radial bores connects said central hole to said gap where said thrust plate and said shaft join, a meniscus being defined in said fluid on either side of said gap to separate adjacent sections of said bearing.

5. A hydrodynamic bearing cartridge as claimed in claim 4 further including grooves formed on at least one of the radial surfaces of each of the thrust plates and counterplates separated by said gap.

6. A hydrodynamic bearing cartridge as claimed in claim 5 wherein said groove patterns are formed on both of said radially extending surfaces of said counter-plate or on both radially extending surfaces of said first and second thrust plates.

7. A hydrodynamic bearing cartridge as claimed in claim 5 wherein said grooves are formed on said outer surface of said shaft or said inner surface of said sleeve facing said end section of said shaft and along a central portion of said gap defined by central surfaces of said shaft and said sleeve between said thrust plates.

8. A hydrodynamic bearing as claimed in claim 4 wherein a first one of said vents joins said gap between said first and second thrust plates.

9. A hydrodynamic bearing as claimed in claim 8 wherein a second one of said vents joins said gap between a top one of said thrust plates and said end of said bearing.

10. A hydrodynamic fluid bearing cartridge as claimed in claim 1 wherein said shaft has first and second ends and said thrust plates are separated from said ends by sections of said shaft defining journal bearing sections, one end of each said journal bearing ending in a meniscus defined by one of said radial vents.

11. A method of assembling the hydrodynamic bearing cartridge of claim 2 including providing a sleeve with at least first and second axially separated steps defined thereon, said steps having different radii, and inserting a first and a second counterplates to rest on said first and second steps so that said gaps between said thrust plates and said counterplate portions of said sleeve are accurately defined.

12. A hydrodynamic fluid bearing cartridge as claimed in claim 2 wherein said bearing fluid includes gas and/or liquid.

13. A hydrodynamic fluid bearing cartridge as claimed in claim 2 wherein each of said thrust plates includes means for defining separate bearing sections adjacent each radial surface of each of said thrust plates.

14. A hydrodynamic fluid bearing as claimed in claim 13 wherein said defining means comprises redial bore extending to a radial end of each thrust plate to join said gap at a first junction and an axial bore located near said shaft and extending axially through said thrust plate to join said gap above and below said thrust plate at second and third junctions, said bearing sections being defined between said first and second, and first and third junctions.

15. A fluid dynamic bearing cartridge as claimed in claim 1 wherein said first and second thrust plates are of different radial dimensions.

16. A fluid dynamic bearing cartridge as claimed in claim 15 wherein the thrust plate of lesser radial dimension is located closer to a base of the cartridge.

17. A magnetic disc storage system comprising a housing for said disc drive, means for supporting one or more discs for constant speed rotation, and means for accessing data storage locations on each of said discs, said means for supporting comprising a plurality of fluid dynamic bearing means for enabling a hub supporting said one or more discs to rotate relative to a shaft supported in said housing, including means for isolating said fluid dynamic bearing means one from another.

18. A magnetic disc storage system as claimed in claim 17 wherein said means for isolating comprise a series of vents extending from a reservoir control to said shaft to a gap hold the fluid.

\* \* \* \* \*